United States Patent
Weiss et al.

(10) Patent No.: US 11,066,037 B2
(45) Date of Patent: Jul. 20, 2021

(54) FRONTAL AIRBAG

(71) Applicant: TRW Automotive GmbH, Alfdorf (DE)

(72) Inventors: Jochen Weiss, Heuback (DE); Sergey Hauer, Schwäbisch Gmund (DE); Hans-Peter Bausch, Alfdorf (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 60 days.

(21) Appl. No.: 16/481,842

(22) PCT Filed: Jan. 25, 2018

(86) PCT No.: PCT/EP2018/051791
§ 371 (c)(1),
(2) Date: Sep. 24, 2019

(87) PCT Pub. No.: WO2018/141615
PCT Pub. Date: Aug. 9, 2018

(65) Prior Publication Data
US 2020/0023804 A1    Jan. 23, 2020

(30) Foreign Application Priority Data
Jan. 31, 2017  (DE) .......................... 102017101895.6

(51) Int. Cl.
*B60R 21/233*    (2006.01)
*B60R 21/2338*   (2011.01)
*B60R 21/00*     (2006.01)

(52) U.S. Cl.
CPC ........ *B60R 21/233* (2013.01); *B60R 21/2338* (2013.01); *B60R 2021/0004* (2013.01)

(58) Field of Classification Search
CPC .............. B60R 21/233; B60R 21/2338; B60R 2021/0004; B60R 21/231
See application file for complete search history.

(56) References Cited

U.S. PATENT DOCUMENTS 5,464,250 A * 11/1995 Sato .................. B60R 21/23138
                                                    280/730.1
8,662,527 B2 * 3/2014 Sato ...................... B60R 21/205
                                                    280/729

(Continued)

FOREIGN PATENT DOCUMENTS

JP        02283545       11/1990
JP        1148906        2/1999

*Primary Examiner* — Darlene P Condra
(74) *Attorney, Agent, or Firm* — Tarolli, Sundheim, Covell & Tummino LLP

(57) ABSTRACT

The invention relates to an inflator holder (14) for an airbag module (10) comprising a holder bottom part (20) in which an inflator receiving hole (18) is formed and comprising a holder sidewall part (22) which delimits, together with the holder bottom part (20), a receiving compartment (26) for an inflator (12) open on a discharge side (28) opposed to the holder bottom part (20). The inflator holder (14) includes a filter grid (24) for exhausting gas fasten A frontal airbag for vehicle occupants, especially a passenger airbag, comprises a contact panel (26) facing the vehicle occupant in the inflated state and including an upper edge and a lower edge (146, 148) as well as two lateral edges (150), wherein in the interior of the airbag tension means (30) are arranged at the contact panel (26), relating to the inflated and mounted state of the airbag, to be horizontally juxtaposed and spaced apart from each other which tension means withhold portions of the contact panel (26) in the inflated state of the airbag. Between horizontally spaced tension means (30) vertically extending, strip-shaped contact panel portions are formed. A substantially vertically extending, rib-shaped pocket being fluid-connected to the interior of the airbag projects toward the vehicle occupant at least at one, preferably at plural strip-shaped contact panel portions on the inflator holder (14) which filter grid at least partially delimits the receiving compartment (26) on the discharge side (28). In addition, the (Continued)

invention relates to an airbag module (10) comprising an airbag (16), an inflator (12) and said inflator holder (14).

21 Claims, 4 Drawing Sheets

(56) References Cited

U.S. PATENT DOCUMENTS

| | | | |
|---|---|---|---|
| 2003/0168842 A1* | 9/2003 | Igawa | B60R 21/233 |
| | | | 280/743.2 |
| 2004/0145162 A1 | 7/2004 | Abe et al. | |
| 2009/0206587 A1 | 8/2009 | Abe | |
| 2015/0232056 A1* | 8/2015 | Miron | B60R 21/2338 |
| | | | 280/735 |
| 2017/0088080 A1 | 3/2017 | Hotta et al. | |
| 2018/0111581 A1* | 4/2018 | Wang | B60R 21/2338 |
| 2018/0126945 A1 | 5/2018 | Aranzulla et al. | |
| 2018/0126946 A1 | 5/2018 | Bausch et al. | |
| 2018/0134244 A1* | 5/2018 | Choi | B60R 21/2338 |

* cited by examiner

FRONTAL AIRBAG

RELATED APPLICATIONS

This application corresponds to PCT/EP2018/051791 filed Jan. 25, 2018, which claims the benefit of German Application No. 10 2017 101 895.6 filed Jan. 31, 2017, the subject matter of which are incorporated herein by reference in their entirety.

BACKGROUND OF THE INVENTION

The invention relates to a frontal airbag for vehicle occupants, especially a passenger airbag, comprising a contact panel facing the vehicle occupant in the inflated state and having an upper edge, a lower edge as well as two lateral edges, wherein tension means restraining portions of the contact panel in the inflated state of the airbag are attached, horizontally juxtaposed and spaced apart from each other, to the contact panel in the interior of the airbag, related to the inflated and mounted state of the airbag, wherein strip-shaped contact panel portions vertically extending between horizontally spaced tension means are formed.

An airbag of this type is known from DE 10 2015 004 956 A1. In said airbag, the beads formed by the indentations are differently large so that the lateral beads extend more closely toward the occupant than the central beads in order to hold the vehicle occupant in the case of oblique impact.

SUMMARY OF THE INVENTION

It is the object of the invention to improve the known frontal airbag in such a way that, on the one hand, it is relatively easy to manufacture and, on the other hand, produces excellent restraint values in the case of oblique impact.

The object is achieved by a frontal airbag of the aforementioned type by the fact that at least at one, preferably at plural strip-shaped contact panel portions an elongate, substantially vertically extending pocket open to the interior of the airbag is provided which in the inflated state forms a vertically extending, bead-like projection shaped toward the occupant along with the assigned strip-shaped contact wall portion.

By the at least one pocket additional material is available at the contact panel which admits lateral movement of the contact panel portion contacted by the occupant in the case of oblique impact. In this way, the head of the occupant is prevented from being rotated, if occupant's face hits the contact panel and the latter does not perform any lateral movement.

The pocket as such can only be identified in the non-inflated state of the airbag only, for in the inflated state of the airbag the pocket is completely gaping and merges into the adjacent part of the strip-shaped contact panel portion without any step. The material of the pocket helps to increase the volume of the bead-shaped projection (hereinafter also abbreviated to "bead"), as compared to an airbag in which the strip-shaped contact panel portion has the same dimensions but no integrated pocket.

The tension means are fastened especially vertically and linearly on the contact panel portion. The indications "vertical" and "horizontal" are always related to the mounted inflated state of the airbag. Due to the linear fastening, the bead-shaped projections extend very uniformly, e.g. similar to barrel-shaped portions.

The vertical length of a fastening line on the contact panel may amount to at least 60%, especially at least 75% of the vertical height of the contact panel from the upper edge to the lower edge in the area of the fastening line so as to maximize the vertical length of the projections.

In the folded state, the at least one pocket is preferably turned inside into the interior of the airbag. Upon inflation, the pocket is then pressed outwardly. By turning inside, the position of the airbag material of the contact panel in the folded state is very precisely predefined. This is advantageous, in turn, to a predeterminable deployment behavior reproducible within narrow limits.

The elongate pocket has, relating to the spread state of the contact panel, an increasing depth starting from its longitudinal ends. In the spread state of the contact panel, the latter is spread and smoothed out at a flat surface without the pocket gaping. This is comparable to ironing the contact panel so that the pocket is folded inwardly like a pleat of a pair of trousers.

The at least one pocket may exhibit a curved contour in the spread state of the contact panel, when viewed transversely to its longitudinal extension. Thus, in the vertical center of the airbag somewhat more panel material is available than at the upper and lower edges to increase the possible lateral movements of the contact panel in this area.

The contact panel is preferably composed of plural interconnected cut parts to facilitate shaping of the inflated airbag in the area of the contact panel and thus the producibility.

At least several, preferably the central cut parts should be longer than wide in the vertical direction, relating to the mounted and inflated state of the airbag. Thus, it is possible to provide additional material along the lateral edges of the cut parts so as to produce the pocket or pockets.

In order to facilitate manufacture of the airbag and to provide as few seams as possible, several, preferably all of the cut parts extend continuously from the upper edge to the lower edge of the airbag. In this context, it is emphasized that, of course, the upper and lower edges as well as the lateral edges of the contact panel cannot be defined as a square-edged end of the airbag in the area of the contact panel, for the edges are rounded to merge into a rear panel to which the contact panel is connected. The upper and lower edges as well as the lateral edges always refer to the mounted and inflated state from the viewpoint of the associated occupant.

At least several, but preferably all of the cut parts should be fastened to a rear panel in the area of the upper and lower edges. The cut parts thus jointly form the contact panel, whereas they need not form the rear panel. In this way, the contact panel and the rear panel can be geometrically formed very independently of each other.

At least several, preferably all of the cut parts take an elongate shape. An upper end and a lower end are connected by an interposed central area, each of the ends being horizontally narrower than the central area located between the ends.

At least several, preferably all of the cut parts in the central area bulge laterally outwardly, i.e. have bulges to form material for the pocket or pockets. The at least one pocket is formed by at least one bulge, preferably by opposed bulges of opposed cut parts, however.

Adjacent cut parts are sewn to each other at the lateral edges delimiting the bulge so as to form the pocket.

The contact panel may be defined at each of the lateral ends by a lateral cut part. Between said lateral cut parts plural central cut parts are located. At least one of the central cut parts, preferably all of the central cut parts, have corners in the non-sewn state. Said corners are formed by a transition from the upper and lower edges to the lateral edges in the central area. Upper and lower corners are opposed to each other in pairs and thus are assigned to each other. Of preference, virtual connecting lines extend in parallel to each other between upper and lower corners assigned to each other in the spread state of the cut part. Thus, substantially vertical beads of the airbag which extend in parallel to each other are defined. In the finished airbag, the virtual connecting lines delimit the strip-shaped contact panel portions against the pocket merging into the contact panel portions.

The contact panel is defined at each of the lateral ends by a lateral cut part having a substantially crescent-shaped cut. The short side of the crescent extends preferably convexly somewhat outwardly but not as convexly as the large curved side of the crescent.

In at least one cut part the tension means is disposed in the area remote from the lateral edges of the cut part.

Especially, the tension means is fastened to the cut part along a vertically extending central line.

The rear panel may be in the form of a one-piece cut part.

A preferred shape of the rear panel consists in that the latter includes two linear edges extending substantially in opposite directions. Said edges may enclose an angle of 150° to 180°, which is not meant to be limiting. At the remote ends of said linear edges, the latter merge into a curved peripheral portion. The curved peripheral portion interconnects the remote ends of the linear edges. Preferably, the curved peripheral portion may consist of three convex areas, with adjacent convex areas being connected to each other by a concave area. The curved peripheral portion preferably includes no abrupt steps or shoulders. Rather, the curved peripheral portion consists of a continuously curved panel.

The connecting seam of adjacent cut parts extends, especially in the mounted and inflated state of the airbag, along the portion of the bead-shaped projection extending most closely toward the occupant, i.e. along the crest of the bead-shaped projection.

Preferably, at least four bead-shaped projections are provided.

The contact panel includes especially plural pockets, wherein the pocket closest to the adjacent vehicle occupant may have a larger maximum depth than the other pocket or pockets.

According to the preferred embodiment, the tension means are especially tethers. Said tethers may be fastened to the rear panel or to a reinforcing layer in the area of the inflation mouth or to the mounting of the airbag on the module or on the inflator.

The tethers extend vertically in the inflated and mounted state, for example, but are rotated about 90° until they are fastened to the rear panel.

Tethers may also be coupled to each other at their rear mounting end so that, when viewed from above, a V-shaped tether extension is produced.

The bead-shaped projections may be different in width, relating to the mounted and inflated state, especially the lateral cut parts may result in wider beads than the central cut parts.

BRIEF DESCRIPTION OF THE DRAWINGS

Further advantages and features of the invention will be resulting from the following description and from the following drawings which are referred to, and wherein.

DESCRIPTION

Figure 1:
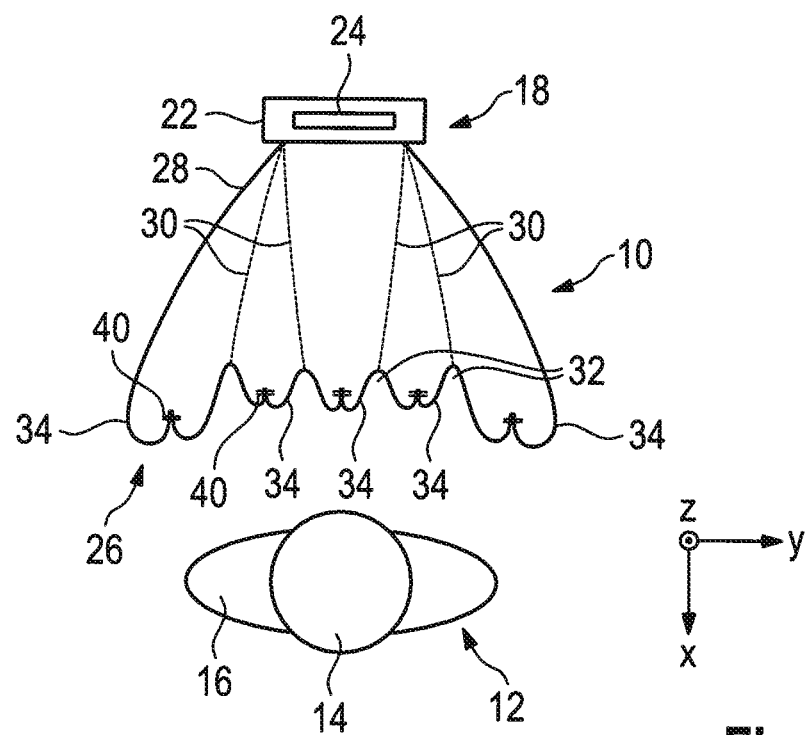
FIG. 1 shows a simplified schematic top view onto a horizontally cut frontal airbag according to the invention in the mounted and inflated state.

FIG. 1 illustrates a frontal airbag 10, more exactly speaking a front passenger airbag. The airbag 10 is shown in a horizontal section from above in the mounted, completely inflated state. The longitudinal vehicle direction, in the driving direction, takes the coordinate x and the transverse vehicle direction, in the horizontal direction, takes the coordinate y. The vertical direction is the direction designated with the coordinate z.

The occupant 12 is shown with his/her head 14 and his/her torso 16.

The airbag 10 is part of an airbag module 18 which is mounted within or beneath the instrument panel and exits the latter. The module housing is provided with the reference numeral 22. An inflator 24 by means of which the airbag 10 is inflated is accommodated in the module housing.

In the folded state, the airbag 10 is completely accommodated in the module housing 22.

It is emphasized that the inflator 24 may be a one-stage or multi-stage inflator including one or more discharge openings spaced apart from each other. Alternatively, also plural inflators 24 are possible.

The airbag 10 has an outer panel including plural portions and areas, wherein the area facing the vehicle occupant 12 is referred to as contact panel 26. A panel opposed to the contact panel 26 is the rear panel 28. Said rear panel 28 faces the instrument panel 20 and the windscreen.

The rear panel 28 is the panel which is fastened on the airbag module side and through which the airbag 10 is locked to the vehicle in the inflated state.

In the interior of the airbag 10, plural tension means 30 are provided in the form of tethers. Said tension means 30 are fastened at one end to the rear panel 28 or else to the module housing 22 or to any part connected thereto. The opposite end of each tension means 30 is fastened to the contact panel 26 and prevents the contact panel 26, during inflation, from being moved unhindered in the fastened area in the direction of the occupant 12. Via the tension means 30 plural indentations 32 and convex bead-shaped projections, hereinafter referred to as beads 34, formed between the indentations 32 and facing the occupant are resulting. Said beads 34 extend substantially vertically with respect to the mounted inflated state.

Depending on the airbag material available between adjacent indentations 32, the extension curved in cross-section as shown in FIG. 1 may result for the beads 34. Depending on whether more or less airbag material is provided, the beads 34 may also be bulged more or less strongly.

A larger bead in this case is the left-hand bead which also is the bead 34 of the airbag 10 ending toward the driver sitting on the left side. Optionally, but not mandatorily, said left-hand bead, more exactly speaking the bead 34 facing the adjacent vehicle occupant, may extend somewhat further in the x direction than the neighboring beads to offer an additional barrier against lateral slipping. This is only an option, as stated before. This applies mutatis mutandis to the right-hand bead 34 in FIG. 1.

As can be further inferred from FIG. 1, the tension means 30 partially converge toward their module-side end and optionally may also be jointly fastened here. In this way, when viewed from above, a V-shaped extension of tension means relative to each other is resulting.

As is evident from FIG. 1, the contact panel 26 is composed of plural interconnected cut parts 42, 44 which are fastened to each other remote from the indentations 32 and especially at the points of the beads 34 which are "highest" in a top view via connectors 40, in this case linearly and vertically extending connecting seams.

The embodiment according to FIGS. 2 to 6 corresponds to the embodiment according to FIG. 1 apart from one difference. In the embodiment according to FIG. 1, there are four tethers 30 which converge V-shaped in pairs, whereas in the other embodiment three tethers 30 extend substantially in parallel to each other. Thus, also a pocket 71 and, correspondingly, a contact panel portion 75 is less provided than in the embodiment according to FIG. 1. Since, however, the remaining design is equal, the slightly varying embodiments may be described in common, and the use of terms and reference numerals refers to both embodiments so that no distinction will be made between embodiments.

Figure 4:
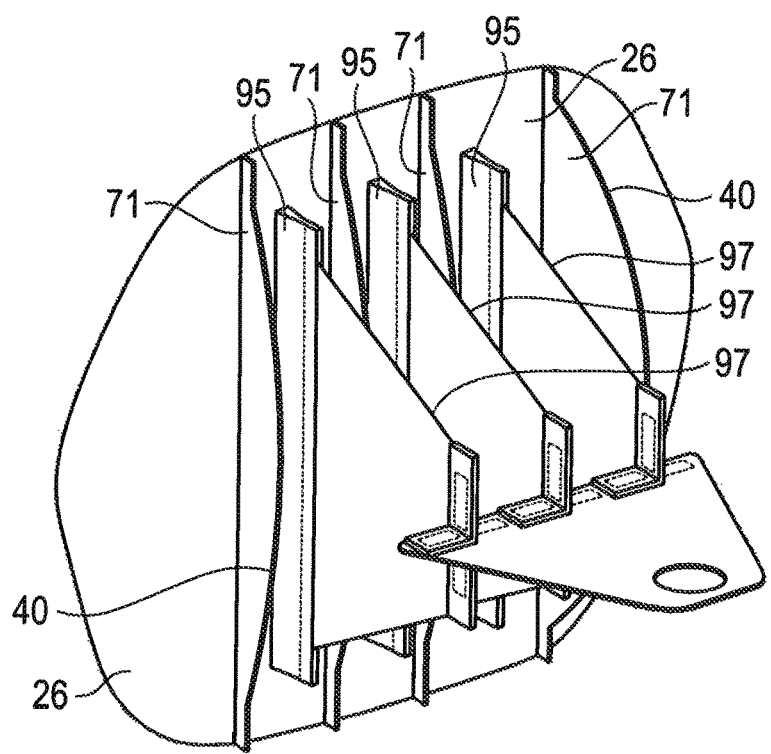
FIG. 4 shows a schematic perspective view slanted from behind of the frontal airbag according to FIG. 2 without a rear panel and with the contact panel shown in an expanded state.
Figure 5:
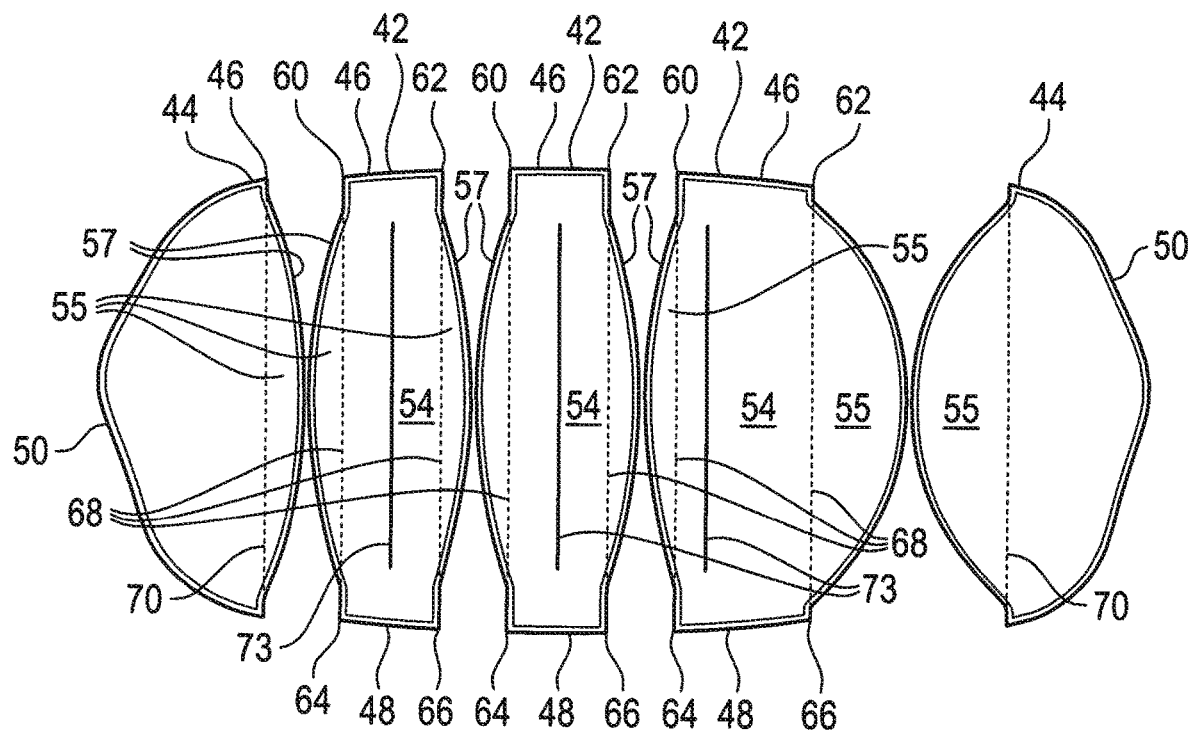
FIG. 5 shows cut parts of the contact panel and the rear panel of the airbag according to the invention according to FIG. 2.
Figure 5:
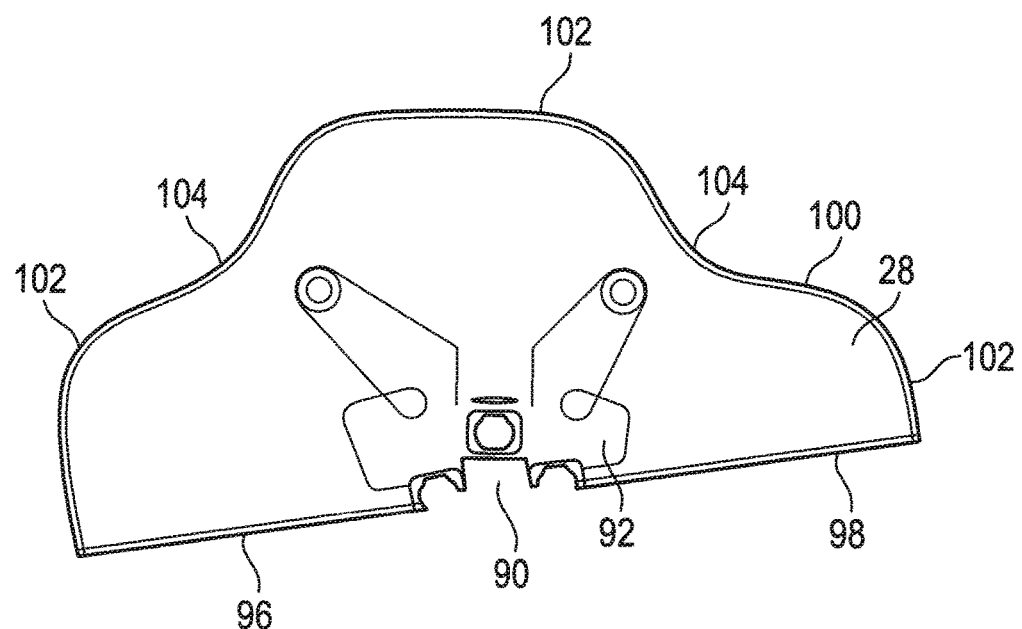
Figure 6:
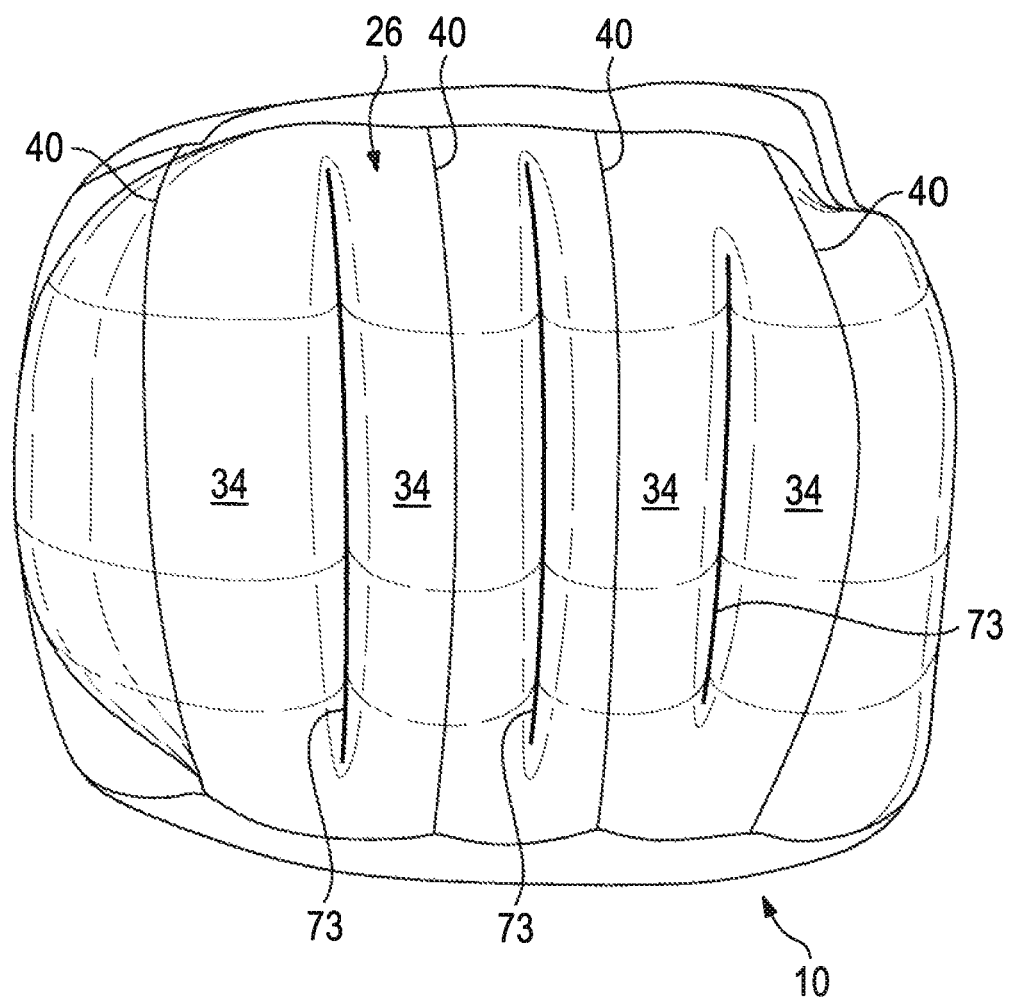
FIG. 6 shows a front view of the airbag according to the invention in accordance with FIG. 2 in the inflated state.

FIG. 6 illustrates the airbag shown in FIGS. 2 to 5 in the inflated state in view of the contact panel 26. The vertically extending barrel-shaped beads 34 the surface of which is formed in portions by the pockets 71 only are interrupted by the vertically extending linear indentations 32 the deepest point of which is defined by a connecting seam forming the fastening line 73 and fixing the contact panel 26 to the tether 30 located there behind. Consequently, the contact panel portions 75 are the portions between adjacent fastening lines 73.

The vertical length of the fastening end 73 amounts to at least 60%, preferably at least 75% of the vertical height of the contact panel 26 from the upper edge to the lower edge 146, 148 in the area of the fastening line 73. Said lengths are measured in the tightly spread state of the contact panel 26, i.e. not in the inflated state of the airbag.

FIG. 6 also illustrates the linearly and vertically extending connectors 40 via which the cut parts of the contact panel 26 are fastened to each other.

The cut parts of the contact panel 26 are shown in FIG. 5 and comprise central cut parts 42 as well as two lateral cut parts 44. The cut parts 42, 44 are flatly spread in FIG. 5 and are shown in a not yet interconnected state so that the upper edges 46 thereof are orientated forwards or upwards and the lower edges 48 are orientated in the opposite direction. The upper edges 46, in the assembled state of the airbag, are those edges which also form the upper edge 146 (see FIG. 3) of the airbag. The lower edges 48 then form the lower edge 148 of the airbag and of the contact panel 26. Moreover, in the assembled state the lateral cut parts 44 including the lateral edges 50 thereof form the lateral edges 150 of the airbag.

All cut parts 42 are longer than wide in the vertical direction. At the upper edge 46 and at the lower edge 48 as well as at the lateral edges 50, the contact panel 26 is sewn to the rear panel 28 the cut of which is equally shown in FIG. 5.

The lateral cut parts 44 have a substantially crescent-shaped cut.

As is evident from FIG. 5, the central cut parts 42 are narrower at the upper and lower ends thereof, which are formed by the upper and lower edges 46 and, resp., 48 here, than a so-called central area 54 between the ends. In said central area 54, the cut parts 42 are bulging laterally outwardly to form so-called bulges 55.

The central area 54 is delimited by continuously curved lateral edges 57.

The upper and lower edges 46, 48 of the central cut parts 42 end in upper corners 60, 62 and lower corners 64, 66 constituting the transition to the lateral edges 56. Virtual connecting lines 68 of vertically opposed corners 60 and 64 and, resp., 62 and 66 extend, on the one hand, within each cut part 42 and, on the other hand, preferably also in parallel to each other from cut part to cut part. Furthermore, also connecting lines 70 may extend from corners of the lateral cut parts 44 in parallel to the connecting lines 68.

If connecting lines 68, 70 can be drawn, they need not necessarily extend in parallel to each other. In the shown example embodiment, the bulges 55 extend between the connecting lines 68, 70 and the adjacent lateral edges 57.

In FIG. 5, at the cut parts 42 furthermore a vertically extending line is shown which constitutes the fastening line 73 along which the tension means 30 is fastened to the cut part 42. The fastening lines 73 extend remotely from the lateral edges 57. In the two cut parts 42 on the left in FIG. 5, the fastening lines 73 extend along a vertically extending center line of the cut part 42.

Figure 3:
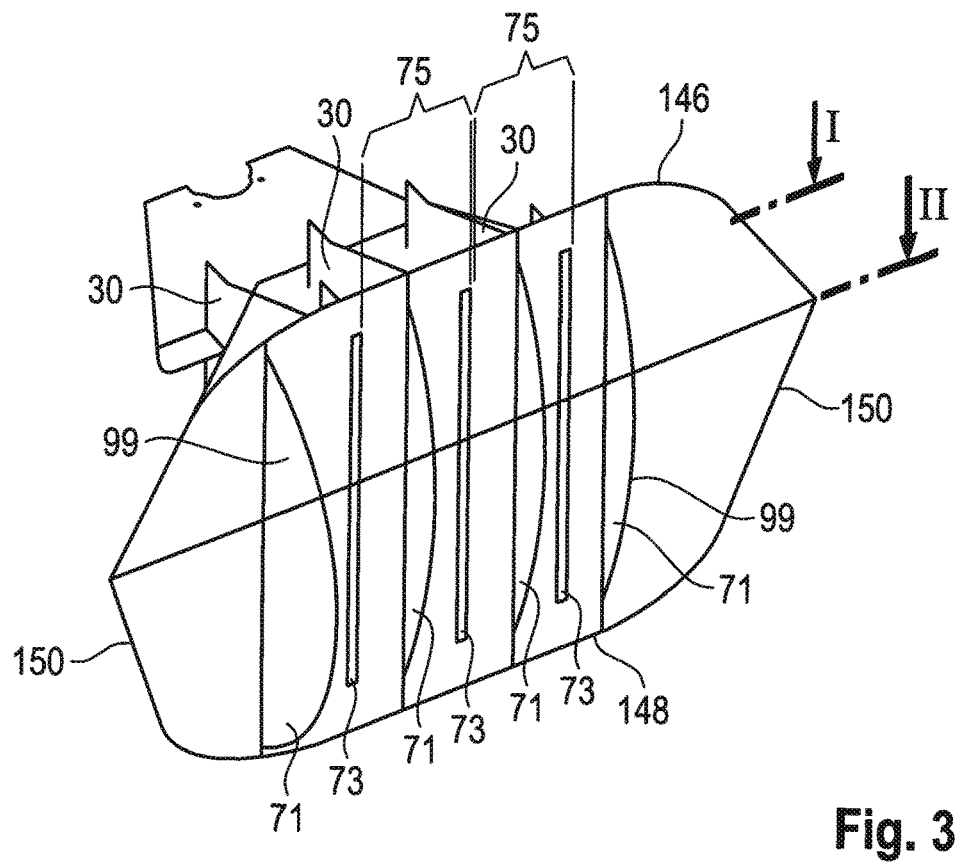
FIG. 3 shows a schematic perspective frontal view of the frontal airbag according to FIG. 2 without a rear panel and with the contact panel shown in an expanded state.

It is evident from FIG. 3 that the fastening lines 73 extend over approximately the entire vertical height of the contact panel 26. At least, the fastening lines extend over 60% of the vertical height of the contact panel from the upper edge to the lower edge 146, 148 in the area of the respective fastening line 73.

The adjacent cut parts 42, 44 are sewn to each other along the lateral edges 57 facing each other. Due to the bulges of the cut parts 42, 44 on the side of the connecting lines 68, 70, pockets 71 are formed in the sewn-up state.

Figure 2:
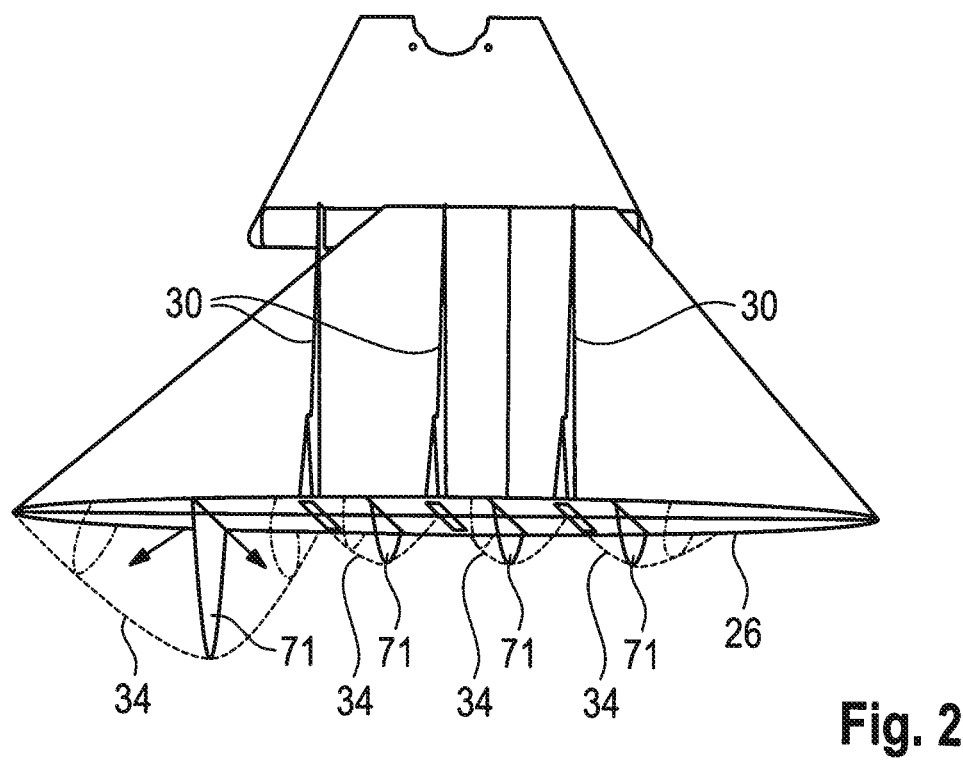
FIG. 2 shows a schematic isometric top view, partially as a transparent view, onto a frontal airbag similar to that according to FIG. 1, comprising a contact panel shown in an expanded state and tension means not yet fastened on the rear side, wherein the contact panel does not exhibit the convex geometry which it has in the inflated state.

In FIGS. 2 and 3, the position of the pockets 71 is clearly visible. The pockets 71 extend between and next to the fastening lines 73. Between the adjacent fastening lines 73 strip-shaped and vertically extending contact panel portions 75 are resulting. Each of said strip-shaped contact panel portions 75 then forms a bead 34 with an assigned pocket 71, when the airbag is completely inflated. This means that each bead 34 is defined by two portions, viz. a portion of two adjacent cut parts 42, 44 and the pocket 71.

Further, pockets 71 are also provided between the lateral edges 150 and the respective next fastening line 73, said pockets also defining the beads 34.

The pocket as such can be identified in the non-inflated state of the airbag only, for, in the inflated state of the airbag, the pocket is completely gaping and without any step merges into the adjacent part of the strip-shaped contact panel portion. The material of the pocket helps to increase the volume of the bead-shaped projection (hereinafter also abbreviated to "bead"), as compared to an airbag in which the strip-shaped contact panel portion has the same dimensions but no integrated pocket.

The pockets 71 shown in FIGS. 2 to 4 in the not yet inflated state then are completely gaping in the inflated state of the airbag and without any step merge into the adjacent part of the strip-shaped contact panel portion 75 so as to increase the bead 34. Said gaping of the pockets 71 is symbolized in FIG. 2 by arrows. Broken lines then indicate the curve of the outer contour of the contact panel 26 in the area of the vertical center of the contact panel 26 in which no pocket 71 would be visible any more. The contour of the contact panel 26 is roughly indicated in the vertical direction by dash-dot lines.

In FIGS. 2 to 4, the contact panel is shown to be slightly tightened in a plane while the tear seams 80 are still existing, wherein the tensioning is so slight that the pocket 84 does not yet gape. This state is intended to illustrate the spread contact panel 26 after manufacture.

The pockets 71 are open toward the interior of the airbag.

In FIGS. 2 and 3, it is evident that in the spread state of the contact panel 26 the pockets have an increasing depth starting from the vertical ends thereof and a curved contour in a side view.

The pocket 71 closest to the adjacent vehicle occupant, the left-hand pocket 71 in FIG. 3, may have a larger depth, when viewed in the x direction, than the other pockets 71. Said larger depth of the pocket is also visible in the cuts according to FIG. 5 already. In this case, the pocket 71 is formed by the two large bulges of the two right-hand cut parts 42, 44 facing each other.

In the not yet inflated state, the pockets 71 are not pressed outwardly already, however, they rather extend into the interior of the airbag, as shown in FIG. 4. This state is also resulting immediately after joining the cut parts 42, 44. In this state, the airbag is folded. Upon inflation, the pockets 71 are pressed outwardly due to the internal airbag pressure so as to finally project from the remaining contact panel 26 and the beads 34. The connectors 40, usually connecting seams, of adjacent cut parts 42, 44 thus extend along the portions of adjacent cut parts 42, 44 extending closest toward the occupant.

Since the connecting seams in FIG. 3 are located inside the pockets 71 and extend along the outer edge 99, they are not visible in this view.

The left-hand bead 34 in FIG. 1 facing the adjacent vehicle occupant is defined by two cut parts 42, 44.

The rear panel 28 has a reinforcing layer 92 sewn to the rear panel in the area of the inflation opening 90. Tension means 30 may be attached to said reinforcing layer 92 by sewing.

It is emphasized that the fastening of the rear ends of the tension means 30 is not yet shown in FIGS. 2 to 4; in this area the individual parts are not yet connected to each other.

The tension means 30 optionally extend from the end by which they are attached to the contact panel 26 in the direction of the rear panel 28 while being twisted about 90°. FIG. 4 moreover illustrates that the tension means may as well be composed of plural parts. For example, straps 95 are approximated to and folded at the respective cut part 42 along their center line which then forms the fastening line 73. Between the folded ends in turn a trapezoidal flexible part 97 which is sewn to the respective strap 95 is located.

As is evident from FIGS. 1 and 6, presently five (FIG. 1) and, resp., four (FIGS. 2 to 6) bead-shaped projections, i.e. beads 34, are formed which extend vertically and in parallel to each other.

The rear panel 28 is shown in its cut at the bottom of FIG. 5. The rear panel 28 is delimited by two linear edges 96, 98 extending substantially in opposite directions at an angle of 150° to 180° as well as a curved peripheral portion 100 connecting the outer ends of said linear edges 98. The curved peripheral portion 100 comprises three convex areas 102 as well as concave areas 104 connecting said convex areas 102.

The invention claimed is:

1. A frontal airbag for vehicle occupants, especially a passenger airbag, comprising a contact panel (26) in the inflated state facing the vehicle occupant and comprising upper and lower edges (146, 148) as well as two lateral edges (150), wherein in the interior of the airbag at the contact panel (26), relating to the inflated and mounted state of the airbag, tension means (30) are disposed horizontally juxtaposed and spaced apart from each other which tension means withhold portions of the contact panel (26) in the inflated state of the airbag, wherein vertically extending strip-shaped contact panel portions (75) are formed between horizontally spaced tension means (30), wherein at least at one strip-shaped contact panel portion (75), at least one elongate, substantially vertically extending pocket (71) open toward the interior of the airbag is provided which together with the assigned strip-shaped contact panel portion (75) forms a vertically extending, bead-shaped projection formed toward the occupant, wherein the tension means (30) are fastened vertically and linearly on the contact panel portion (75) and in that the vertical length of a fastening line (73) at the contact panel (26) amounts to at least 60% of the vertical height of the contact panel (26) from the upper edge to the lower edge (146, 148) in the area of the fastening line (73).

2. The frontal airbag according to claim 1, wherein the at least one pocket (71) in the folded state is turned inside into the interior of the airbag and can be pressed outwardly upon inflation.

3. The frontal airbag according to claim 1, wherein the at least one elongate pocket (71), relating to the spread state of the contact panel (26), has an increasing depth starting from the longitudinal ends thereof.

4. The frontal airbag according to claim 3, wherein the at least one pocket (71) in the spread state of the contact panel has a curved contour when viewed transversely to the longitudinal extension thereof.

5. The frontal airbag according to claim 1, wherein the contact panel (26) is composed of plural interconnected cut parts (42, 44).

6. The frontal airbag according to claim 5, wherein at least several of the cut parts (42, 44) are longer than wide in the vertical direction, relating to the mounted and inflated state of the airbag.

7. The frontal airbag according to claim 5, wherein at least several of the cut parts (42, 44) extend continuously from the upper edge to the lower edge (146, 148).

8. The frontal airbag according to claim 5, wherein at least several of the cut parts (42, 44) are fastened to a rear panel (28) in the area of the upper and lower edges (146, 148).

9. The frontal airbag according to claim 5, wherein at least several of the cut parts (42, 44) have an upper end and a lower end each of which is horizontally narrower than a central area (54) located between said ends.

10. The frontal airbag according to claim 9, wherein at least several of the cut parts (42, 44) in the central area (54) include laterally outwardly facing bulges (55), wherein the at least one pocket (71) is formed by at least one bulge.

11. The frontal airbag according to claim 10, wherein adjacent cut parts (42, 44) are sewn to each other at peripheral edges (57) delimiting the bulges (55) so as to form the at least one pocket (71).

12. The frontal airbag according to claim 5, wherein the cut parts (42, 44) comprise central cut parts (42) and lateral cut parts (44), wherein the contact panel (26) is defined at each of the lateral ends by one of the lateral cut parts (44) and therebetween the central cut parts (42) are located, wherein at least one of the central cut parts (42) has corners (60-66) forming a transition from the upper and lower edges (46, 48) to the central area (54), with upper and lower corners (60-66) being assigned to each other in pairs and being opposed to each other, with virtual connecting lines (68) extending in parallel to each other between upper and lower corners (60-66) assigned to each other in the spread state of each cut part (42).

13. The frontal airbag according to claim 5, wherein the cut parts (42, 44) comprise central cut parts (42) and lateral cut parts (44), wherein the contact panel (26) is defined at each of the lateral ends by one of the lateral cut parts (44) having a substantially crescent-shaped cut.

14. The frontal airbag according to claim 5, wherein in at least one cut part (42) a tension means (30) is disposed in the area remote from the vertical lateral edges (57) of the cut part (42).

15. The frontal airbag according to claim 14, wherein the tension means (30) is fastened along a vertically extending center line at the cut part (42).

16. The frontal airbag according to claim 5, wherein a connecting seam (40) extends from two adjacent cut parts (42, 44) in the mounted and inflated state of the airbag along the portion of the bead-shaped projection extending most closely toward the occupant.

17. The frontal airbag according to claim 1, wherein a rear panel (28) is provided which is in the form of a one-piece cut part.

18. The frontal airbag according to claim 17, wherein the rear panel (28) includes two linear edges (96, 98) substantially extending in opposite directions which at their remote ends merge into a curved peripheral portion (100), the curved peripheral portion (100) interconnecting the two remote ends of the linear edges (96, 98) and the curved peripheral portion (100) three convex areas (102), with adjacent convex areas (102) being connected to each other by a concave area (102).

19. The frontal airbag according to claim 1, wherein at least four bead-shaped projections are provided.

20. The frontal airbag according to claim 1, wherein the contact panel (26) includes plural pockets (71) and the pocket (71) being closest to the adjacent vehicle occupant, relating to the spread state of the contact panel (26), has a larger maximum depth than the other pocket or pockets (71).

21. The frontal airbag according to claim 1, wherein the tension means (30) are tethers.

* * * * *